United States Patent [19]

Heath et al.

[11] Patent Number: 4,765,859
[45] Date of Patent: Aug. 23, 1988

[54] METHOD OF MAKING FILTERCLOTHS BY INDUCTION HEATING

[76] Inventors: Clive A. Heath, 'Greatwood', Offley Brook, Eccleshall, Staffs, England; Barry F. Hibble, 36 Main St., Amesbury, Mass. 01913

[21] Appl. No.: 10,909
[22] PCT Filed: Jun. 12, 1986
[86] PCT No.: PCT/GB86/00335
§ 371 Date: Feb. 5, 1987
§ 102(e) Date: Feb. 5, 1987
[87] PCT Pub. No.: WO87/00074
PCT Pub. Date: Jan. 15, 1987

[30] Foreign Application Priority Data

Jul. 9, 1985 [GB] United Kingdom ............... 8517311

[51] Int. Cl.⁴ ............................................. B32B 31/26
[52] U.S. Cl. .............................. 156/272.4; 156/273.9; 156/275.3; 156/275.7; 428/65; 428/78
[58] Field of Search ..................... 428/57, 58, 64, 65, 428/137, 78, 196, 198, 247, 255, 256; 156/73.1, 73.4, 272.4, 273.9, 275.3, 275.7

[56] References Cited

U.S. PATENT DOCUMENTS 2,711,828  6/1955  Webb ................................ 210/169

FOREIGN PATENT DOCUMENTS 1135803  12/1968  United Kingdom .

Primary Examiner—Marion C. McCamish
Attorney, Agent, or Firm—C. O. Marshall, Jr.

[57] ABSTRACT

A method of making a filtercloth which includes fixing components to the cloth includes the use of a thermoplastic bonding agent mixed with a ferrous metal powder. The bonding agent is induction heated to fuse the parts together, using the metal as a susceptor. FIG. 3a is a section through a typical assembly being bonded.

1 Claim, 2 Drawing Sheets

METHOD OF MAKING FILTERCLOTHS BY INDUCTION HEATING

This invention relates to filtercloths of the kind used in filter presses for clay, chemical or mining industries. These filtercloths comprise relatively large areas of textile material forming the filtering surface, with (usually) rubber, plastic or material sockets attached by which the material to be filtered is introduced between successive chambers of the filter press. Sometimes gussets, reinforcing elements and fixing elements are also attached.

The conventional method of manufacturing a filter cloth of this kind is to sew the parts together. This is time consuming and expensive, and moreover tends to create weaknesses due to the stitch holes. Other methods used to avoid those problems involve the use of adhesives and bonding agents alone or more usually in conjunction with stitching. It is almost invariably necessary to use matched dies (which are complementary in shape to the components concerned—and hence possibly several sets of dies are needed for each pattern of filter) to clamp the parts under pressure during the bonding or whilst the adhesive sets.

The object of the present invention is to provide improvements.

According to the invention, a method of bonding filtercloth components together comprises locating a thermoplastic bonding agent, mixed with a ferrous metal powder, between the juxtaposed components and using induction heating to fuse the agent to the components.

By the term "components" is included both textile parts and non-textile parts such as moulded rubber, synthetic rubber or plastics components.

By the term induction heating is meant the use of (primarily) radio frequencies which act to heat the metal powder.

The ferrous metal powder may be for example iron oxide or a stainless steel powder. The particle size will be between 10's mesh and 400's mesh. The particle size is chosen according to the frequency range of the induction heater. The higher is the frequency the smaller the particles need to be.

The proportion of metal powder used will be between 1% and 50% by volume of the bonding agent.

The non-textile elements may be made of thermoplastic materials themselves, which hitherto have not been able to be welded because of the risk of damage by the heat, but according to the invention there is no difficulty in this because the heating effect is confined to the bonding agent where the metal powder acts as a susceptor.

The bonding agent is essentially sympathetic to the components. Conveniently it is of the same material as the filter cloth, where possible, e.g., where a polypropylene filter cloth is employed, the bonding agent may itself be polypropylene, and so on.

The bonding agent may be a sheet, or foil or strand with the metal powder distributed therein made e.g. by hot rolling an extruded mixture or extruding the thermoplastic and metal powder.

Matched dies are unnecessary with the invention because the heating effect originates in the bonding agent rather than being by conduction from the dies. The bonding agent can cool naturally when the induction heater is switched off, and high pressure is unnecessary to hold the parts together.

The invention is particularly convenient in enabling thermoplastic rubbers to be used as pre-formed mouldings, which is impossible when heat is applied from dies if the invention is not employed because of the risk of damage to the mouldings in fusing the bonding agent or adhesive.

The invention can also be applied to form impervious areas over or adjacent to the cloth face, by bonding two layers of the perforate material together with the interposed (imperforate or homogeneous layer of) bonding agent.

By the use of the invention sewing can be completely eliminated in the manufacture of filter cloths thus leading to stronger and more accurately assembled filters with substantial elimination of the possibility of leakage around the centre cores due to the complete bonding of the components.

The invention is further described with reference to the accompanying drawings wherein:-

Figure 3A:
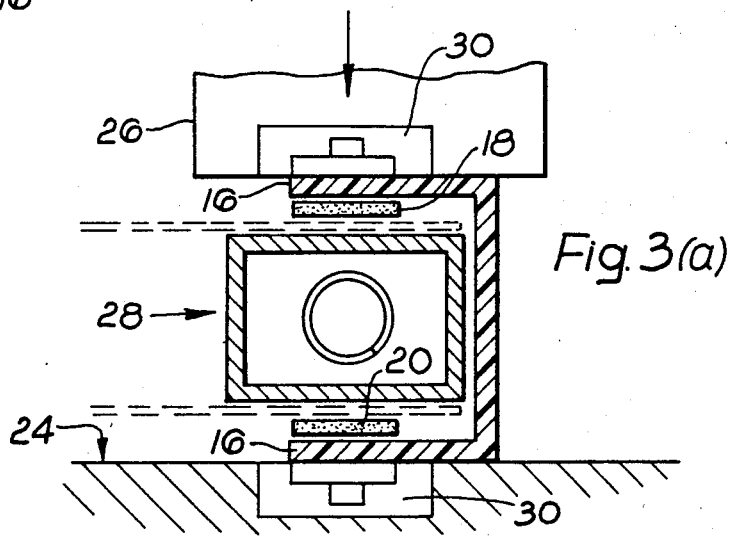

FIG. 3a, b and c is a series of further enlarged sectional elevation showing the process in operation.

Figure 1:
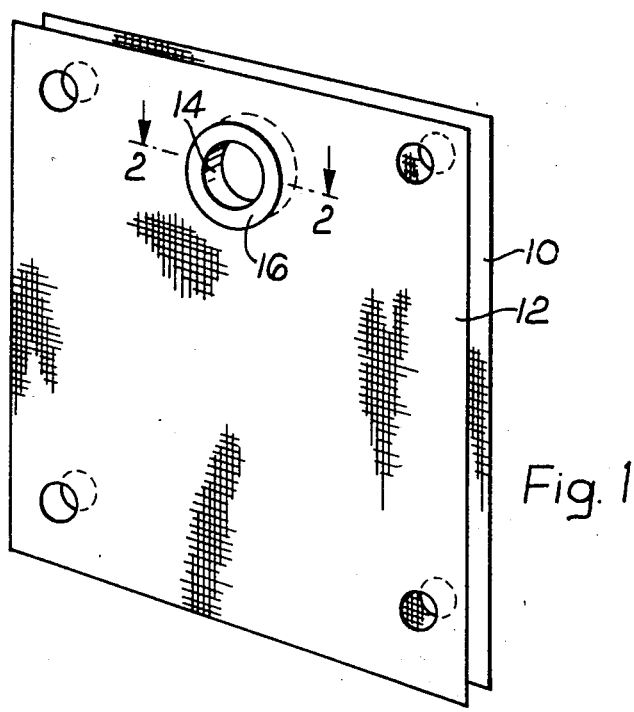
FIG. 1 is a perspective view showing a portion of a filter bag.

Referring to the drawings, FIG. 1 shows two sheets of filter cloth which may be a natural or man-made (or any combination) woven material indicated by the reference numerals 10 12. It is to be appreciated that FIG. 1 is diagrammatic and shows a relatively small portion of each of the sheets of cloth.

In this illustrative example, a rubber or like component forming a tube 14 is to extend through the two cloths and has radially extending flanges 16 at each end of the tube, each of these flanges overlaying a corresponding one of the two cloths in the vicinity of the tube, and the flanges require to be fixed to the respective cloths in a sealed fashion.

Figure 2:
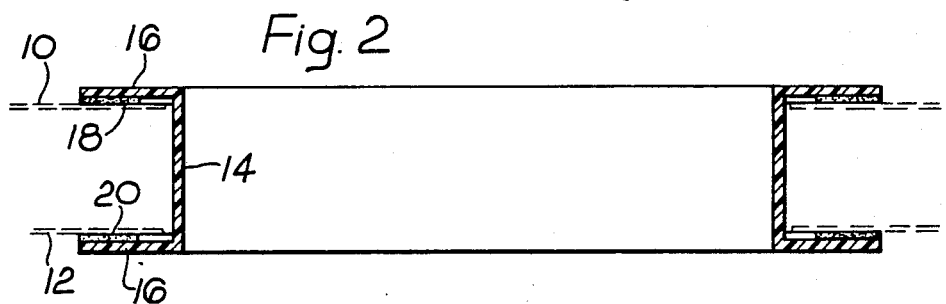
FIG. 2 is an enlarged fragmentary sectional view taken on the line 2—2 of FIG. 1.

This is accomplished by locating an annular piece of bonding agent 18 20 between each of the flanges and the adjacent surface of the cloth as shown in FIG. 2.

FIG. 3a shows the assembly, in radial section, assembled between an anvil or support plate 24 and a pressure member 26, which respectively contact the flanges 16. An induction heating device 28 is located between the two cloths to cause the bonding agent to heat and become fused and bonded to the respective surfaces adjacent to each area of bonding agent. Reflectors 30 to intensify the field are positioned in the support plate 24 and the pressure member 26.

Figure 3B:
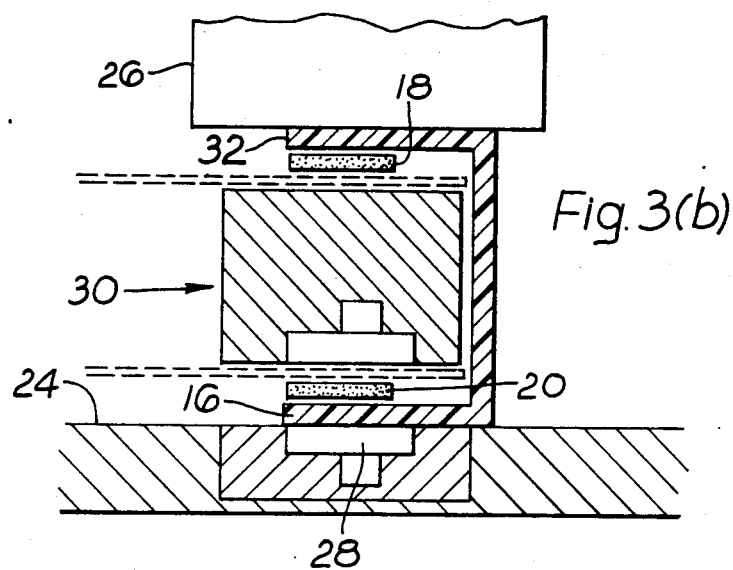

Alternatively FIG. 3(b) shows the assembly where only one flange 16 is being processed with the second flange 32 to be processed at a later stage.

Figure 3C:
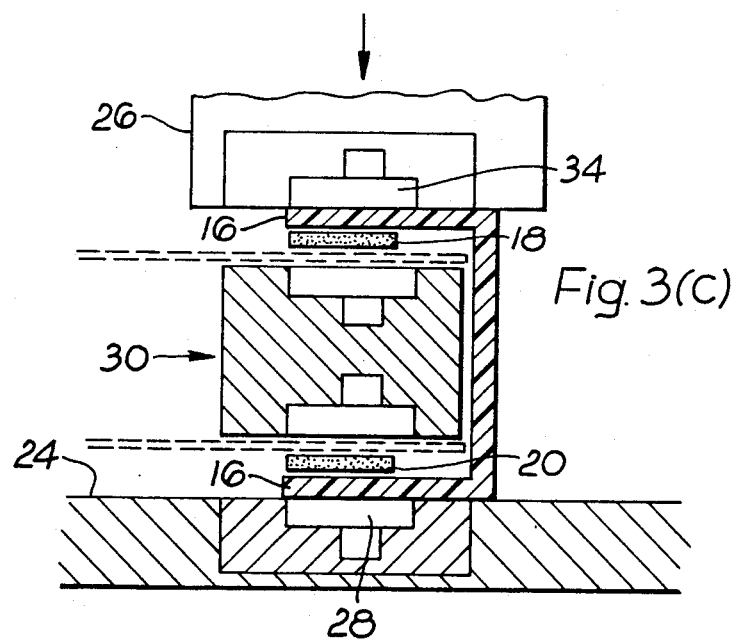

Alternatively FIG. 3(c) shows the assembly where there are two induction heating devices 28 and 34 with the reflector 30 double sided located between the cloths.

It will be appreciated that where the article is a tubular component as in FIGS. 1 and 2, that the induction heating device 28 needs to be annular, which may be possible where the finished component, after removal of the anvil and pressure member, can be drawn through the interior perimeter of the ring die. In other situations the induction heater 28 may be made of a number of segments assembled together to provide heating over the annular zone required.

We claim:

1. A method of making a filter including the steps of bonding two pieces of cloth to the flanges of a flanged tube by locating an annular piece comprising a thermoplastic bonding agent mixed with a ferrous metal powder between each flange and the adjacent surface of the cloth and then using induction heating to heat the ferrous metal powder and thus cause the bonding agent to bond the cloth to the flanges.

* * * * *